United States Patent
Maresca

(10) Patent No.: US 11,194,756 B2
(45) Date of Patent: *Dec. 7, 2021

(54) SYSTEMS AND METHODS FOR FACILITATING INTERACTIONS WITH REMOTE MEMORY SPACES

(71) Applicant: Zentific LLC, Milford, CT (US)

(72) Inventor: Steven Maresca, Ashford, CT (US)

(73) Assignee: Zentific LLC, Milford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/243,248

(22) Filed: Jan. 9, 2019

(65) Prior Publication Data
US 2019/0384742 A1  Dec. 19, 2019

Related U.S. Application Data

(63) Continuation of application No. 15/333,374, filed on Oct. 25, 2016, now Pat. No. 10,204,075.

(51) Int. Cl.
*G06F 15/173* (2006.01)
*G06F 9/50* (2006.01)
*G06F 9/54* (2006.01)

(52) U.S. Cl.
CPC ...... *G06F 15/17331* (2013.01); *G06F 9/5077* (2013.01); *G06F 9/544* (2013.01)

(58) Field of Classification Search
None
See application file for complete search history.

(56) References Cited

U.S. PATENT DOCUMENTS

| | | | | |
|---|---|---|---|---|
| 5,949,985 A | * | 9/1999 | Dahl | G06F 9/45537 703/26 |
| 6,714,942 B1 | * | 3/2004 | Westcott | G06F 9/465 719/315 |
| 9,495,284 B1 | * | 11/2016 | Cai | H04L 1/008 |
| 2013/0262801 A1 | * | 10/2013 | Sancheti | G06F 3/0619 711/162 |
| 2014/0068557 A1 | * | 3/2014 | Vanags | G06F 8/315 717/116 |
| 2017/0123975 A1 | * | 5/2017 | Tseng | G06F 12/0269 |
| 2017/0177520 A1 | * | 6/2017 | Kampe | G06F 13/28 |
| 2017/0185310 A1 | * | 6/2017 | Cayton | G06F 3/064 |
| 2017/0220259 A1 | * | 8/2017 | Choi | G06F 3/0634 |
| 2017/0277655 A1 | * | 9/2017 | Das | G06F 3/061 |
| 2018/0004687 A1 | * | 1/2018 | Guim Bernat | H04L 67/10 |
| 2019/0081932 A1 | * | 3/2019 | Kumar | H04L 63/0876 |

* cited by examiner

*Primary Examiner* — Elias Mamo
(74) *Attorney, Agent, or Firm* — DeLio Peterson & Curcio LLC; Todd A. Bayne, Jr.

(57) ABSTRACT

Systems and methods for facilitating interactions with remote memory are disclosed. An observing task can execute in a first environment allocated to a first memory space, and a second memory space can be remote from the observing task. An interposition system proxy can invoke at least one function implemented using an ad hoc polymorphic programming language feature to facilitate requests from the observing task to the second memory space. This can include traversing a data structure for at least one target object, resolving an address in the second memory space based on the traversal, and at least one of reading data from and writing data to the resolved address in the second memory space.

14 Claims, 8 Drawing Sheets

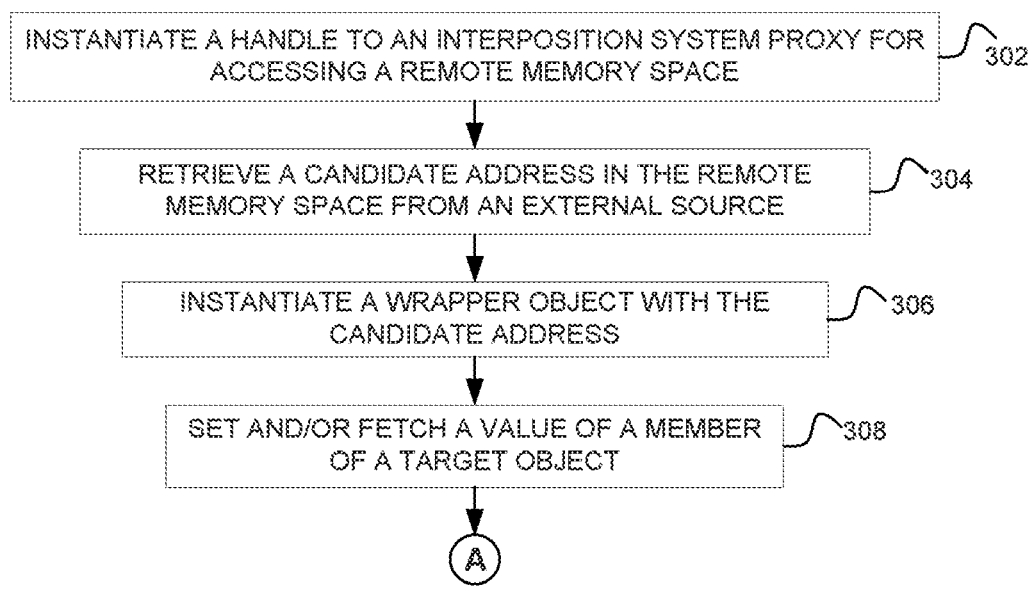
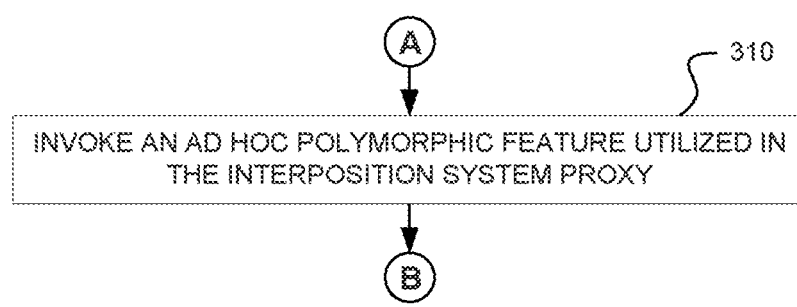

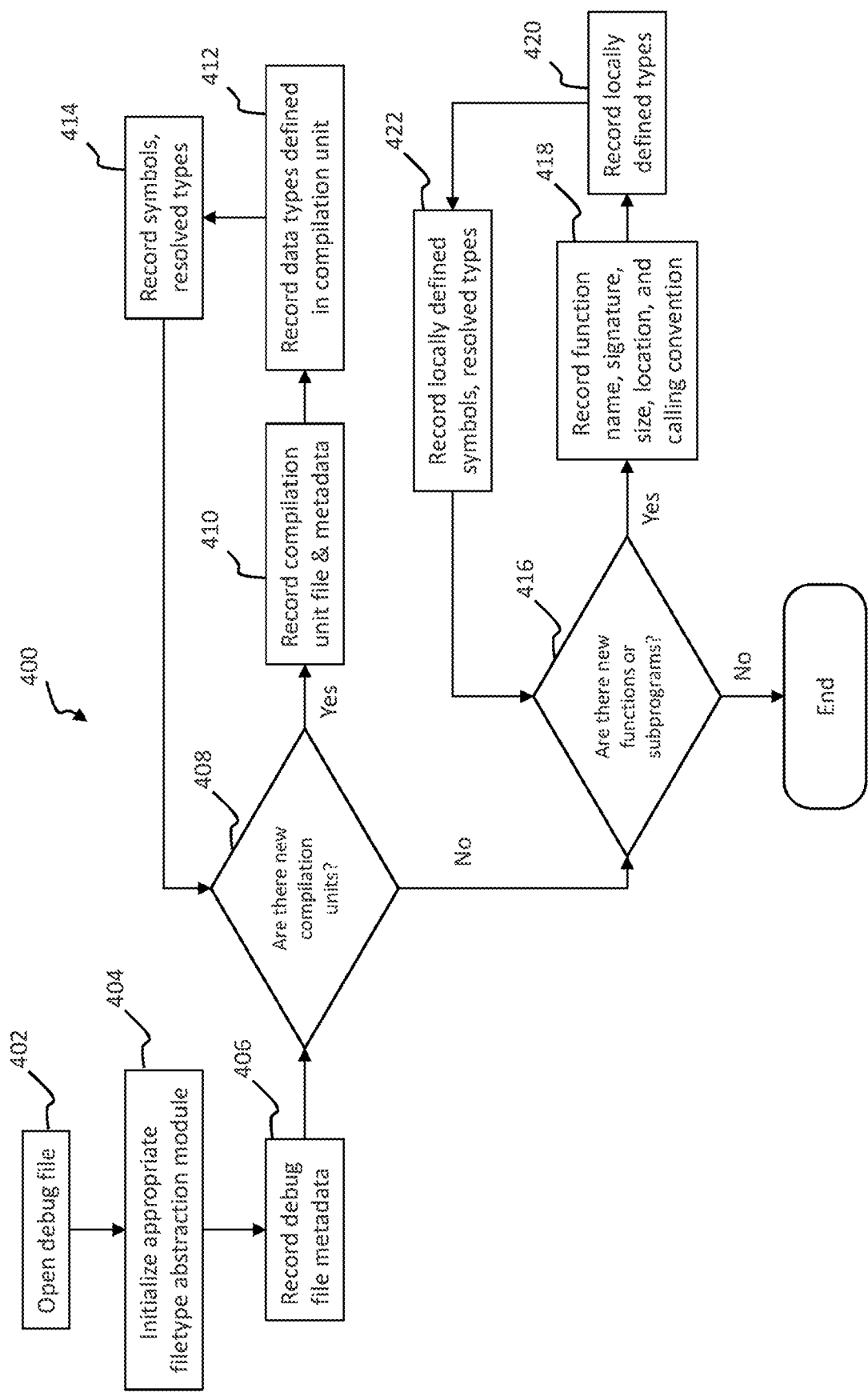

SYSTEMS AND METHODS FOR FACILITATING INTERACTIONS WITH REMOTE MEMORY SPACES

BACKGROUND OF THE INVENTION

Hardware is a crucial part of a computer system that defines its physical capabilities, but it is software (and the creativity behind it) that exploits those capabilities and makes great and useful applications. There currently exists a vast array of programming languages; some popular ones include C, C++, Python, and Java, and many more continue to be developed. Different languages are often used for different applications and environments, but at a fundamental level, software can be characterized as a set of instructions that manipulate data (i.e., ones and zeros) in memory. Nevertheless, computer programming can be complicated, especially for large projects that require teams of coders each working on a different aspect of an overall application.

In some environments, such as virtual machines, challenges abound in the management of software and hardware interactions. One such challenge is the difficulty associated with accessing, analyzing, and/or modifying data located in memory that is remote to the memory space of a task requesting access. The underlying problem is that most programming languages assume and require direct operations upon memory (e.g. to dereference pointers, access relative-offset memory addresses, etc.), and thus interaction with data is limited to the memory space that is directly addressable by the executing task. Compiled software also conforms to this basic assumption because the syntax of most programming languages assumes only localized memory space access, and so the syntax cannot be used to interact with remote memory.

One conventional technique to address this issue involves using a hypervisor to facilitate inter-virtual-machine access. In this case, an application in a first virtual machine may request a hypervisor to read memory allocated for an application within a second virtual machine (or, in other words, remote memory), and the hypervisor may confirm that the first application has privileges to access that memory. In a simpler non-virtualized scenario, a first application may request from its OS kernel access to the memory of a second application; if allowed, the OS will facilitate access to the requested data. Once access has been granted and facilitated by a hypervisor or OS to remote memory, data in remote memory must be accurately interpreted. This technique, however, requires detailed knowledge of data structures used in remote memory, memory layout, application/OS versions, and virtual machine configurations and is difficult to implement. Particularly, explicit and complex remote memory addressing/interpreting instructions must be included within the program source code of the first application. These instructions retrieve data from a source system and translate that data by mimicking operations otherwise implicitly performed by a computer program compiler or interpreter. The translation step is achieved via memory addressing calculations and facilitated by metadata (i.e., information that describes the boundaries of a remote memory space and the data structures and types residing within that space, and that permits correct interpretation of memory layout). All of this adds a high degree of complexity to the source code, makes the development process inefficient and exhausting, and yields code that is challenging to read and debug. For example, what might normally be accomplished in local memory by a simple line of code in native language syntax can often require an additional ten to twenty lines or more of code just to handle the necessary remote memory addressing calculations.

Accordingly, it would be advantageous to provide systems and methods that address the aforementioned problems.

SUMMARY OF THE DISCLOSURE

Systems and methods that facilitate interactions with remote memory are disclosed. More specifically, this specification describes computer techniques for interpreting requests from observing tasks to access memory outside of the memory space allocated to the observing task. Access to or interactions with remote memory may include reading and/or writing to the remote memory, for example. As used herein, the term "observing task" is understood to mean a task that interacts with remote memory (in addition to local memory) to determine the state of and/or to interact with another task. In contrast, an "observed task" as used herein is a task that interacts solely with local memory and which may be observed by an observing task. Also, as used herein, the term "task" is understood to refer generally to a process, a thread, OS kernel, or the like. Additionally, the terms "remote memory" and "remote memory space" are understood to be a region of memory that is not directly addressable by an observing task, such as a memory space that is not continuous with or existing within the memory space of the observing task. Unlike local or localized memory, which is accessed via low level computer processing unit (CPU) instructions using addresses, interactions with remote memory conventionally require an application programming interface ("API"). Virtual machine introspection (VMI), which involves the interpretation of an operating system (OS) or application memory extracted from a virtual machine or made available via an API or proxy, is one example of a conventional technique that uses remote memory access.

In various embodiments, an abstraction or interposition system proxy accesses remote memory by mimicking semantics of "native language syntax," which is understood to be the specified grammar of a programming language. In one novel aspect, the interposition system proxy enables transparent determination of and access to remote memory space addresses for traversal of data structures located in the remote memory. This technique allows software developers to investigate and account for remote memory addresses, data types, and data descriptions, and facilitates the development of programs that interact with such spaces to be as efficient and natural as coding their interactions with localized memory.

Exemplary embodiments of novel interposition systems and methods leverage advanced features of programming languages to transparently perform native language operations, such as dereferencing, assignment, address calculations, and the like. Examples of such features include, but are not limited to, function decorators in the Python language and operator overloads in C++, Java, etc. The features can be utilized as points of interposition to read from and/or write to remote memory spaces and to traverse data structures based on the properties of target objects. Using these features to perform low level memory calculations and address translations can reduce code complexity and internalize much of the complexity otherwise required of developers developing software that interacts with remote memory spaces.

In some embodiments, a system environment for facilitating interactions with a remote memory space is provided.

The system can include a first memory space including an observing task and a second memory space remote to the observing task. The system further includes an interposition proxy having at least one function, each function being invocable using a corresponding ad hoc polymorphic programming language feature. The interposition proxy is configured to facilitate requests from the observing task to the second memory space by traversing a data structure for at least one target object and resolving an address in the second memory space based on the traversing, and reading data from and/or writing data to the resolved address in the second memory space.

In some embodiments, a method for facilitating interactions with a remote memory space is provided. The method includes initializing an interposition proxy for a target object associated with a candidate address in the remote memory space, the interposition proxy including at least one function implemented using at least one ad hoc polymorphic programming language feature. The method also includes invoking an ad hoc polymorphic programming language feature for the target object, utilizing the ad hoc polymorphic programming language feature to traverse a data structure for the target object and to resolve an address in the remote memory space based at least in part on the candidate address, and reading data from and/or writing data to the resolved address in the remote memory space.

In some embodiments, a method for facilitating interactions with a remote memory space is provided. The method includes associating an interposition proxy with an observing task, the interposition proxy having at least one function implemented using at least one ad hoc polymorphic programming language feature, the observing task being configured to submit requests for accessing the remote memory space. The method further includes, during execution of the observing task, invoking the at least one ad hoc polymorphic programming language feature, resolving an address for a target object required by the observing task, and writing data to and/or reading data from the remote memory space based on the resolved address.

The details of one or more implementations are set forth in the accompanying drawings and the description below. Other features and advantages will be apparent from the description and drawings.

BRIEF DESCRIPTION OF THE DRAWINGS

For a fuller understanding of the inventive embodiments, reference is made to the following description taken in connection with the accompanying drawings in which:

FIGS. 3A-3D show flowcharts of an exemplary method 300 for facilitating interactions with remote memory space(s) using an interposition proxy, in accordance with various embodiments;

FIG. 4 shows a flowchart of a known method 400 of extracting data from a debug file;

DETAILED DESCRIPTION OF THE PREFERRED EMBODIMENTS

Figure 1:
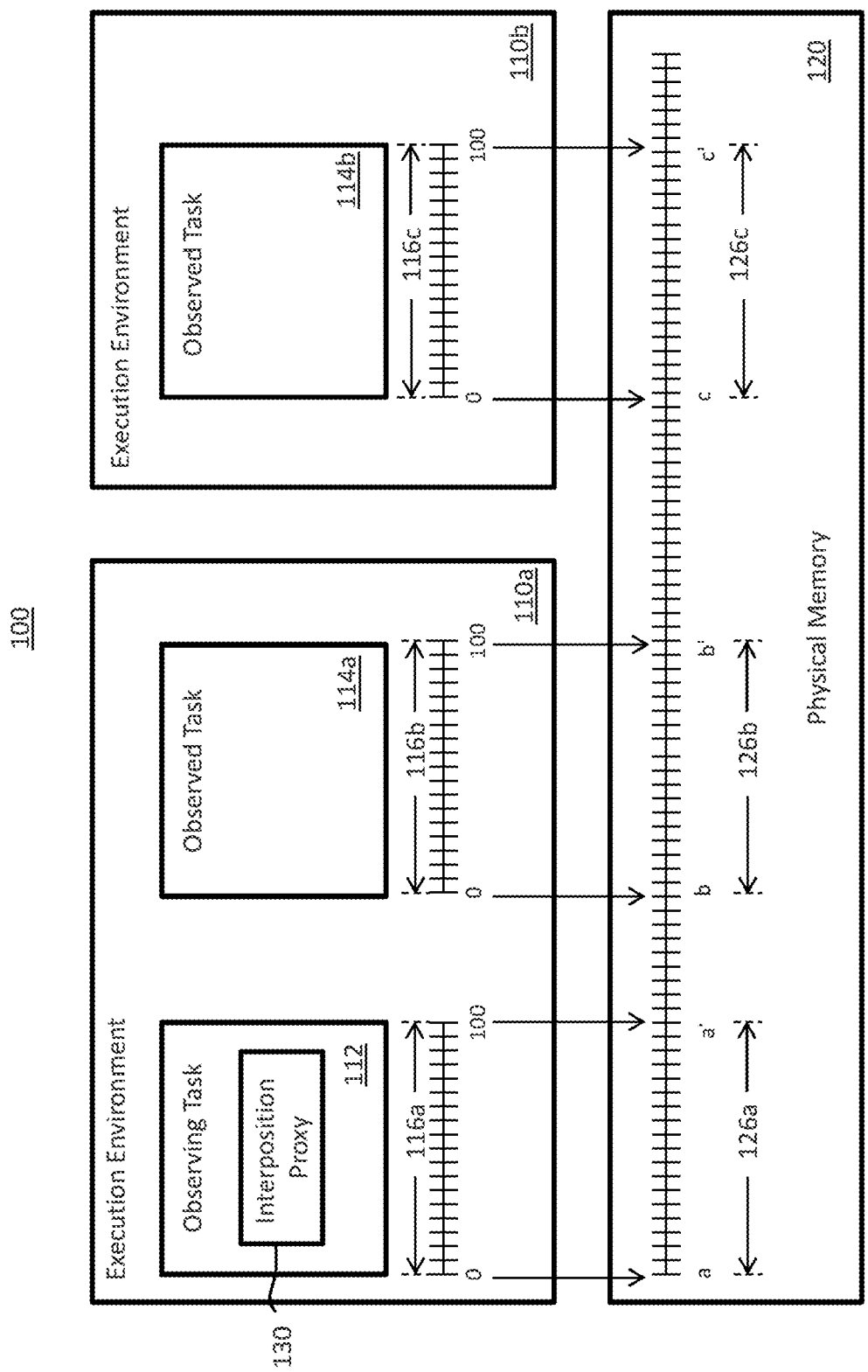
FIG. 1 shows a schematic representation of system 100, in accordance with various embodiments.

FIG. 1 shows a schematic representation of system 100, in accordance with various embodiments. System environment 100 includes execution environment 110a in which observing task 112 and observed task 114a are executing, and execution environment 110b in which observed task 114b is executing. Execution environments 110a and 110b each represents a distinct environment that supports the execution of computer instructions. An execution environment may include, for example, an OS running on an individual computer, a virtual machine, or in a container; an individual application container; or the like. Observing task 112 and observed tasks 114a and 114b each represents a task running within the scope of a particular execution environment.

An execution environment allocates a logical address space, also known as a virtual address space, to each task running within its scope. The logical address space allocated to each task is the set of addresses that the execution environment makes available to the task. In FIG. 1, observing task 112 is allocated logical address space 116a, observed task 114a is allocated logical address space 116b, and observed task 114b is allocated logical address space 116c.

When the execution environment allocates the logical address space, it also maps the logical address space to a corresponding physical address space in physical memory 120. At runtime, mapping between logical and physical addresses is typically handled by a memory management unit (not shown) and is transparent to the executing task. Although FIG. 1 depicts a one-to-one mapping of contiguous logical address spaces 116a, 116b, and 116c to corresponding contiguous physical address spaces 126a, 126b, and 126c, respectively, in practice, physical address spaces are typically not contiguously addressed. Accordingly, the memory space for each task is defined in a discrete region of physical memory 120 that may be contiguous, segregated, or otherwise discontinuous.

In various embodiments, an observing task might attempt to access remote memory based on one or more of the following: a microprocessor/hardware architecture specification (e.g. special addresses such that those for VGA character buffers), an abstract industry specification (such as for the extended firmware interface (EFI) BIOSes), CPU registers pointing at a particular address, an address specified in an API, an address defined in debug data for a particular program (e.g. a kernel or a web browser), kernel data structures referencing regions of processes (e.g. where a binary was originally mapped into memory), engineer or developer personal knowledge, reverse engineering, and a 'search' program checking successive addresses while attempting to locate data known to be in memory at an unknown location.

Additionally, an observing task might be cognizant or aware of the existence of an observed task in a variety of ways. For example, the existence of an observed task that is an OS kernel, may be inferred based on virtual machine configuration (e.g. known to be Windows or Linux per administrator designation). As another example, the existence of an observed task that is a process managed by a kernel, may be inferred via virtual machine configuration and identified by traversing kernel memory to locate the target process or processes. As yet another example, an observed task that is a 'container', can often (though not always) be equivalent to either an OS or a specialized process run by a specialized lightweight kernel. An observed task may also be inferred from CPU activity even if it is not explicitly tracked by an OS kernel (e.g. a malicious task which has hidden itself to avoid administrator detection).

It is understood that data being interpreted can be considered as extracted or in situ. Data can be examined using one or more capabilities of the novel interposition proxy to interact with the API, and expose the remote memory to basic operations like read/write (this capability is separate from programming language interpretation and instead uses information from language interpretation to dictate data read/written). Some data structures can only be interpreted with all of their component parts immediately accessible (extracted in totality); for these, all bytes needed to fully describe the data would be read at once. Others can be interpreted/manipulated by checking only a subset of its components; for these, a subset of all bytes that fully describe the data would be read. This is common with very large data structures (e.g. for performance reasons) and with 'versioned' or 'subtyped' data structures with a flag/integer, which can specify one of multiple ways the data might be interpreted, for example, structure with a 'kind' flag, an integer 'length' and a list 'data' of other integers—'kind' might be set to 'integers' or 'characters' to mean a 'interpret this data as' a list of plain integers or a list of ASCII characters specified by integer value.

Addresses within a memory space (such as pointer values within a structure), offsets, and translation (e.g. of a logical address to/from a physical address) are interpretable only within the scope of the task to which the memory space is allocated. Thus, direct, facile interactions with such isolated, remote memory spaces are generally not possible, nor are direct interactions with physical memory 120 generally possible due to constraints imposed by the operating system, memory segmentation, memory paging, CPU architectural specifications, or even generic memory protection software. For example, as depicted in FIG. 1, observing task 112 executes within memory space 116a of execution environment 110a and thus has direct access to addresses '0' through '100' of memory space 116a and corresponding physical addresses a through a'. However, since observing task 112 executes outside of the scope of memory spaces 116b and 116c, which are allocated to observed tasks 114a and 114b, respectively, interactions with these remote memory spaces are generally not possible. In fact, attempts by observing task 112 to access addresses '0' through '100' of memory space 116b, for example, might instead result in access only to addresses '0' through '100' of memory space 116a.

In the C programming language, for example, a struct data structure will have a unique base address, and each member of the struct starts at an offset from that unique address. An operation, such as 'struct name'→'member name', invoked to access a particular component or member of the struct, involves calculating the location of the member by adding the offset address of that member to the base address of the struct. This memory addressing scheme is seamless for objects or data located in localized memory—the mere instruction 'struct name'→'member name' will suffice. If the data structure referenced by 'struct name', is stored in remote memory, however, the struct and member names will not be available within the scope of observing task 112 and invocation of the 'struct name'→'member name' will fail to resolve the correct address in physical memory.

To further complicate matters, a list data structure extracted from a remote memory space, for example, can include one or more pointers for referencing list entries and list data. When analyzed by an observing task 112, however, these values may, upon inspection or translation: reference data existing outside of memory currently allocated to the observing task (e.g. a 32-bit process faced with a 64-bit pointer referencing an address greater than 32-bits); reference valid destinations within the observing task's memory space, but point to unrelated data in local memory allocated to the observing task rather than remote memory allocated to the observed task; upon translation of a virtual address, reference an unmapped physical address; upon translation of a virtual address, reference a mapped physical address associated with unrelated data; or reference data shared between the requesting process and remote memory, mapped in different locations.

Consequently, many implicit programming language operations malfunction or fail if attempted upon such extracted data. Data must be evaluated within the context/state of the remote memory space to prevent errors or misinterpretations. For example, an attempt to traverse a data structure using a C/C++ operation, such as int avg_temp=statistics→averages→temp could run afoul of any of the aforementioned problems. If the pointer to the 'averages' member of the 'statistics' structure from remote memory is NULL/unmapped within the memory space of the observing task, the requesting process will crash or encounter a subtle error. Given that a valid address within the operating scope of the observing task is likely to be invalid within remote memory, access to data in the remote memory is frustrated. Operations, such as pointer arithmetic, pointer dereferencing, and, as mentioned above, offset calculations, are thus not straightforward. For example, access to the member 'temp' representing average temperature would require multiple steps: each member access operator (e.g. →) would minimally convert to an address calculation and pointer value fetch, in addition to a final fetch of data corresponding to the size of an integer. This, again, imposes a high burden on developers building software that interact with remote memory spaces, requiring developers to have specialized knowledge in subtle nuances of often multiple language specifications and precise compiler/interpreter behavior.

When traversing a C language struct in local memory, the instruction 'c→b→a' involves simply resolving the base address of 'c', identifying the offset of 'b', reading 'b', and determining whether 'b' is null or valid. If 'b' is null, an exception is thrown; if 'b' is valid, then 'a' may be accessible. As discussed above, conventionally, enabling an observing task to interact with remote memory spaces, involves adding lines of memory address calculation directly into the source code. Thus, a simple instruction 'c→b→a', where a remote memory space is involved, would require additional lines of code to identify the base address of 'c' in remote memory, the offset of 'b', etc.

In order to seamlessly handle remote memory interactions like this, observing task 112 can instantiate an interposition proxy 130. Interposition proxy 130 may be embodied, for example, as a library that is loaded into memory of observing task 112 that provides functionality for facilitating interactions between observing task 112 and remote memory space 116b and/or remote memory space 116c. Interposition proxy 130 advantageously provides for efficient and transparent remote memory space access function(s). In some embodiments, these remote memory space access functions employ ad hoc polymorphism in order to implement remote memory access functionality in a manner that is transparent to the program developer. Accordingly, in various embodiments, interposition proxy 130 can include a library of one or more functions invocable during execution of observing task 112. The function(s) in interposition proxy 130 can involve one or more ad hoc polymorphic operator definitions, such as definitions for dereferencing, addressing calculations, and assignment operations. For example, in the C++ programming language, interposition proxy 130 may use operator overloading in order to provide context-dependent definitions of operator behavior, such that, depending on the context, the operator would transparently perform the desired operation on either a local or remote memory space. In using C++ to implement the interposition proxy, for example, the addition ('+') operator, which is defined in a class definition, can be redefined via one or more library classes to perform functions suitable for facilitating interaction with remote memory spaces.

It should be understood that the functions in interposition proxy 130 can be different depending on the selected programming language. For example, if interposition proxy 130 is implemented in C++, the function(s) can define operator overloads for operations such as member and/or array access operators, addition and/or subtraction operators, the dereferencing operator, or the like. In this case, an access operator (→) in the C instruction 'c→b→a' can invoke the overloaded definition of the access operator defined in interposition proxy 130. As another example, if the interposition system proxy is implemented in the Python programming language, function decorators may be employed for the same purpose.

Interposition proxy 130 can therefore function as a tool to mask the fact that a remote memory space, such as addresses '0' through '100' of remote memory space 116b or remote memory space 116c, are external to the scope of operation of observing task 112. In this regard, the novel system can allow use of a native language syntax to develop software that interacts with remote memory spaces. This technique can, therefore, advantageously improve operating efficiency by removing unnecessary lines of source code and relieve software developers of the need to implement complex memory request instructions in the source code.

Figure 2:
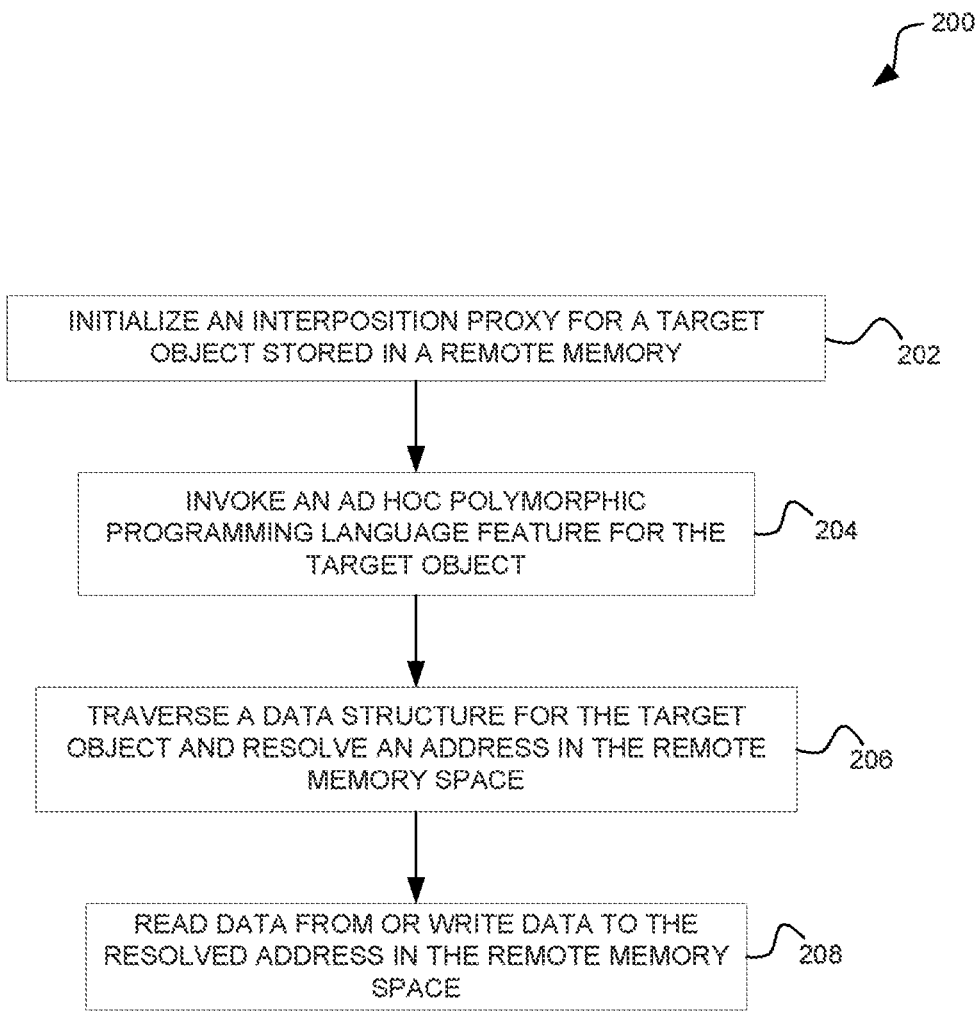
FIG. 2 shows a flowchart of an exemplary method 200 for facilitating interactions with a remote memory space using an interposition proxy, in accordance with various embodiments.

FIG. 2 shows a flowchart of an exemplary method 200 for facilitating interactions with a remote memory space using an interposition proxy, in accordance with various embodiments. At step 202, the method can include initializing an interposition proxy for a target object associated with a candidate address. The interposition proxy (e.g. interposition proxy 130) can include at least one function configured to interface with an observing task (e.g. observing task 112) within a remote memory space. For example, observing task 112 can initialize the interposition proxy during execution. In some embodiments, initializing an interposition proxy can involve the process shown and described with respect to FIG. 3A.

At step 204, the method can include invoking the at least one ad hoc polymorphic programming language feature for the target object. For example, if the interposition system proxy is implemented in C++, the method can include invoking one or more of operator overload features in C++ for the target object. If the interposition proxy is implemented in Python, the method can include invoking one or more function decorators. In some embodiments, initializing an interposition proxy can involve the process shown and described with respect to FIG. 3B.

At step 206, the method can include utilizing the invoked ad hoc polymorphic programming language feature to traverse a data structure for the target object and to resolve an address in the remote memory space based at least in part on the candidate address. For example, the method can include utilizing one or more operator overload features, such as an overloaded version of the member access operator (→), the array access operator ([×]), the addition operator, the subtraction operator, and/or the dereferencing operator (*) to resolve an address in memory space 116b based on the candidate address. In some embodiments, utilizing the invoked ad hoc polymorphic programming language feature to traverse a data structure for the target object and to resolve an address in the remote memory space based at least in part on the candidate address can involve the process shown and described with respect to FIG. 3C.

At step 208, the method can include at least one of reading data from and writing data to the resolved address in the remote memory space. For example, the method can include fetching data from or setting data to the resolved address in memory space 116b. In some embodiments, initializing an interposition proxy can involve the process shown and described with respect to FIG. 3D.

FIGS. 3A-3D show flowcharts of an exemplary method 300 for facilitating interactions with remote memory space(s) using an interposition proxy, in accordance with various embodiments. Generally speaking, the flowcharts depict accessing and traversing a data structure akin to a C language struct located in a remote memory space for purposes of reading data from and/or writing data to a backing memory address. It should be appreciated, however, that similar traversal methods can be implemented for different programming languages, and that the description regarding the C language herein is made merely for illustrative purposes.

In the exemplary process described with respect to FIGS. 3A-D, an address of a parent or container data structure is used to calculate or otherwise determine the address of a target child or inner data structure. Address calculations can be made based on various aspects of data type information including, but not limited to, type size, member offset, and application programming interface (API) specification, and can be performed by invoking and utilizing select ad hoc polymorphic programming language features. As described above, in the scenario that the interposition proxy is implemented in C++, for example, the ad hoc polymorphic programming language features can include operator overloads, such as the member access operator, the array access operator, the addition and subtraction operators, the dereferencing operator, and the like.

After the appropriate address is determined, the interposition proxy can read and/or write to the backing remote memory location having a size appropriate for the target data. The backing remote memory location can include the range of memory addresses representing the data being requested. This might be, for example, a 4-byte region at address 0x12345 when describing a 32-bit integer, a 2048-byte range used to represent a character array storing a string of text, or a region of a size necessary to describe a larger complex data structure. In some embodiments, the region is greater than or equal to 1-byte, even if the data is a single bit flag stored within a 1-byte integer (e.g. an architecture imposed minimum 1-byte request).

Method 300 can, for example, be invoked during execution of an observing task (such as observing task 112) when access to a remote memory space (such as memory space 116b) is required. At step 302, the method can include instantiating a handle to an interposition proxy for accessing at least one remote memory space. For example, the method can include instantiating a handle to interposition proxy 130 for accessing remote memory space 116b. In some embodiments, initialization of an interposition proxy can include an OS system call that instantiates the handle to the interposition proxy. In other embodiments, a linked library can be loaded that creates the handle. In still further embodiments, the remote memory space is represented as a local file.

At step 304, the method can include retrieving a candidate address in the remote memory space from an external source. For example, the method can include retrieving a candidate address in remote memory space 116b from an external source. In various embodiments, the external source can include a symbol, a runtime artifact, or the like.

At step 306, the method can include instantiating a wrapper object with the candidate address. Instantiating a wrapper object with the candidate address can include allocating an object, via the interposition proxy, which represents a type stored in remote memory at a particular address. The wrapper object knows the type (size, layout, etc.) of the underlying object and internally performs complex interactions with the interposition proxy. For example, the following exemplary object oriented code demonstrates how a wrapper object may be instantiated:

```
uint64_t candidate_address = 0x123345;
//a guess produced by a search or hardcoded from the
hardware specification
iproxy_handle handle =
obtain_access_to_remote_memory(memory_space_identifier);
objecttype variablename = new objecttype(vmhandle,
candidate_address)
```

At step 308, the method can include setting and/or fetching a value of a member of a target object. The target object can, for example, be data in remote memory space 116b represented by or accessible via the wrapper object instantiated in step 306. Step 308 can thus include setting and/or fetching the value of a member of that target object in remote memory space 116b. By specifying the member of the target object upon which to perform an operation, the value of the member of the target object indicates where to stop the traversal. If the address of that member is known in advance, no traversal is necessary, and the read/write can occur immediately. A member of a target object may exist in complete form at an address, but without foreknowledge of that specific address, it can only be located by traversal via a container/parent.

At step 310, the method can include invoking at least one ad hoc polymorphic programming language feature utilized in the interposition proxy. For example, in the case of the C++ or Java programming languages, the method can include invoking one or more operator overloads (such as member and/or array access operators, addition and/or subtraction operators, the dereferencing operator, or the like). As another example, in the case of the Python language, the method can include invoking one or more function decorators.

At step 312, the method can include determining whether the target object has a parent object. The parent object can represent or be a container or reference point for particular data. In C/C++, parent objects tend to be laid out sequentially in memory: a container type starts at an address A and a member of the container type starts at an address A+offset. For example, consider a C struct named X with members a, b, c: struct X { int a; char b; double c;};. In this instance, the parent object of c would be x, the memory location of x is A and the memory location of c is A+offset. That offset is determined by the size of preceding members a and b and compiler alignment constraints. A parent object (or chain of parent objects) provides the base address from which the offset and consequently the address of a child object is calculated. As another example, consider a C struct named v:

```
struct V {
    int w;
    char random;
    struct W {
        int vcoord;
        int wcoord;
    } a_W;
    int stuff;
} an_V;
```

Given an_V, an instance of type struct V: the wcoord member of the a_W member (of type struct W, which is nested within struct V) is not independently addressed. Rather, its address is based on an offset summation, i.e., the base address of an_V+the offset of a_W relative to the base address of an_V+the offset of wcoord relative to the base address of a_W.

Figure 3C:
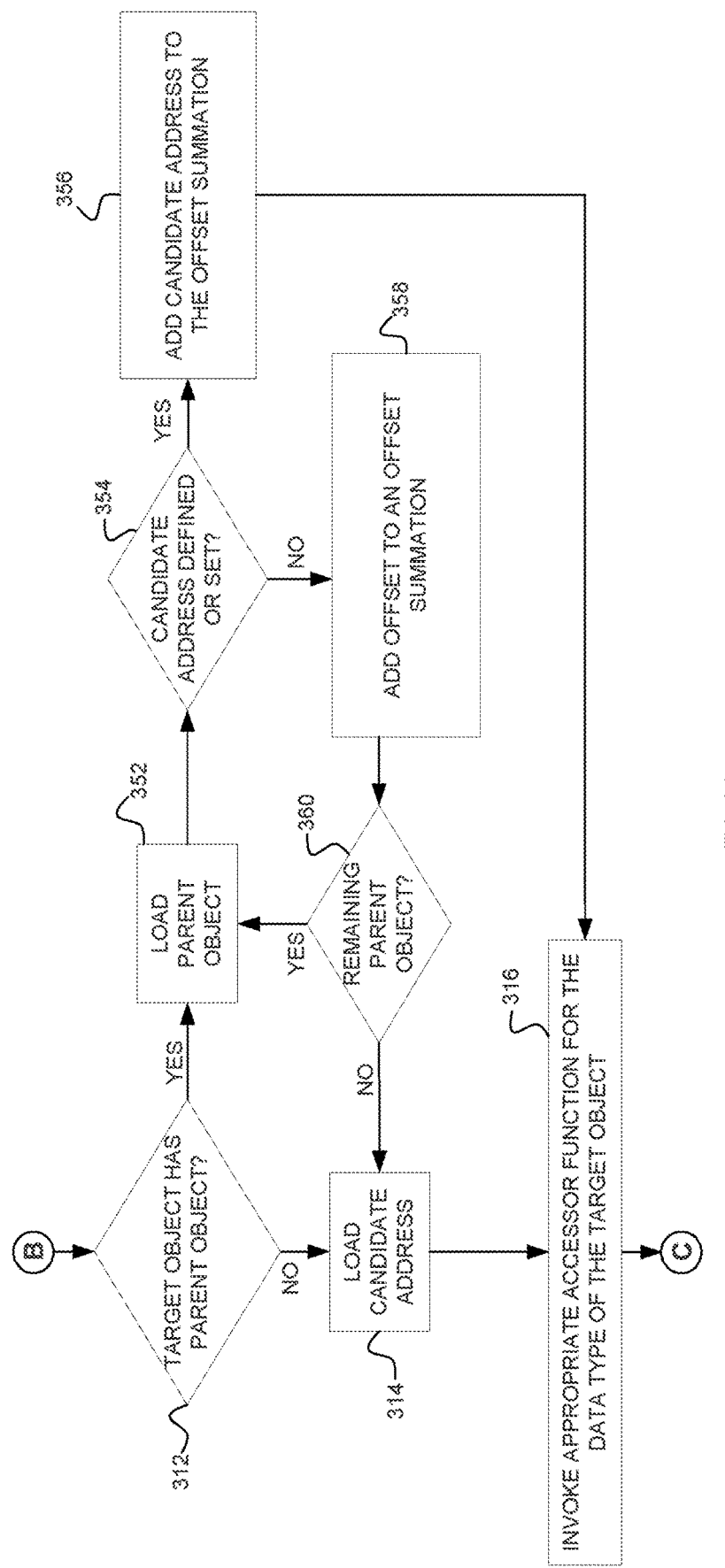

Returning to FIG. 3C, if, at step 312, the target object is determined to have a parent object, then the method can proceed to point A, which can lead to the flowchart of an exemplary method 350 shown in FIG. 3B. On the other hand, if, at step 312, the target object is determined not to have a parent object, then the method can proceed to step 314.

At step 314, the method can include loading the candidate address.

At step 316, the method can include invoking an appropriate accessor function for the data type of the target object. The accessor function can, for example, be statically determined at the time of compiling the observing task via templates and/or generics or, alternatively, dynamically determined at runtime via properties of the target object. After step 316, the method can proceed to point C, which can lead to the flowchart of an exemplary method 370 shown in FIG. 3D.

Referring to FIG. 3C, at step 352, the method can include loading the parent object. This can involve keeping track of an offset summation, as described in more detail below. In the case of struct V above, if the target object is member w, for example, then the method can include loading an_V.

At step 354, the method can include determining whether the candidate address is defined or set in the parent object. In the case of struct V above, for example, the method can include determining whether the candidate address of member w is defined or set in an_V. If, at step 354, the candidate address is determined to be defined or set in the parent object, then method can proceed to step 356. On the other hand, if, at step 354, the candidate address is determined not to be defined or set in the parent object, then the method can proceed to step 358.

At step 356, the method can include adding the candidate address to the offset summation. As disclosed above, determining the address of member w described above can require an offset summation involving the addition of the base address of an_V to the offset of w relative to the base address of an_V. The method can then proceed to step 316.

If at step 354, the candidate address is not defined or set, the method can proceed to step 358, which can include adding an offset to an offset summation. Next, at step 360, the method can include determining whether the target object has a remaining parent object. If, at step 360, the target object is determined to have a remaining parent object, then the method can proceed to step 352 and repeat. On the other hand, if, at step 360, the target object is determined not to have a remaining parent object, then the method can proceed to point C, which can return to step 314 of method 300.

It is understood that steps 358 and 360 essentially keep track of any nesting relationships of a data structure. As disclosed above, for example, determining the address of wcoord of the a_W member described above can require an offset summation involving the following calculation: offsetof (wcoord)+offsetof(a_W). In total, the address of wcoord=offsetof(ycoord)+offsetof(a_W)+addressof(an_V), where an_W is one parent object and an_V is a higher level parent object. It is thus understood that the offset summation can be kept in the loop as part of steps 312, 352, 354, 356, 358, 360, 314, for example. In this sense, one offset summation can be maintained per target object, while the address of the target object is being resolved.

As described above, the method can arrive at step 314 of method 300 from either step 312 or step 360 of method 350 via point C. The loading operation in step 314 is the same in either case, although the address to be loaded may originate or be derived differently as per steps 312 and 358. In particular, the address derived in step 358 is a calculated address, whereas the address derived in step 312 can be an explicitly defined address (e.g. the base address of an_V in the example above, where an_V has no parent type from which its address is derived). An explicitly (or directly) defined address is an absolute requirement when the target object has no parent address. In this scenario, step 314 can include loading the direct address of the target object. It is understood that a wrapper of a target data type is of limited use if no address is available. It is also understood that the method can reach step 316 via only one of step 312 of method 300 and step 360 of method 350—it would be an error if both paths are simultaneously valid.

Figure 3D:
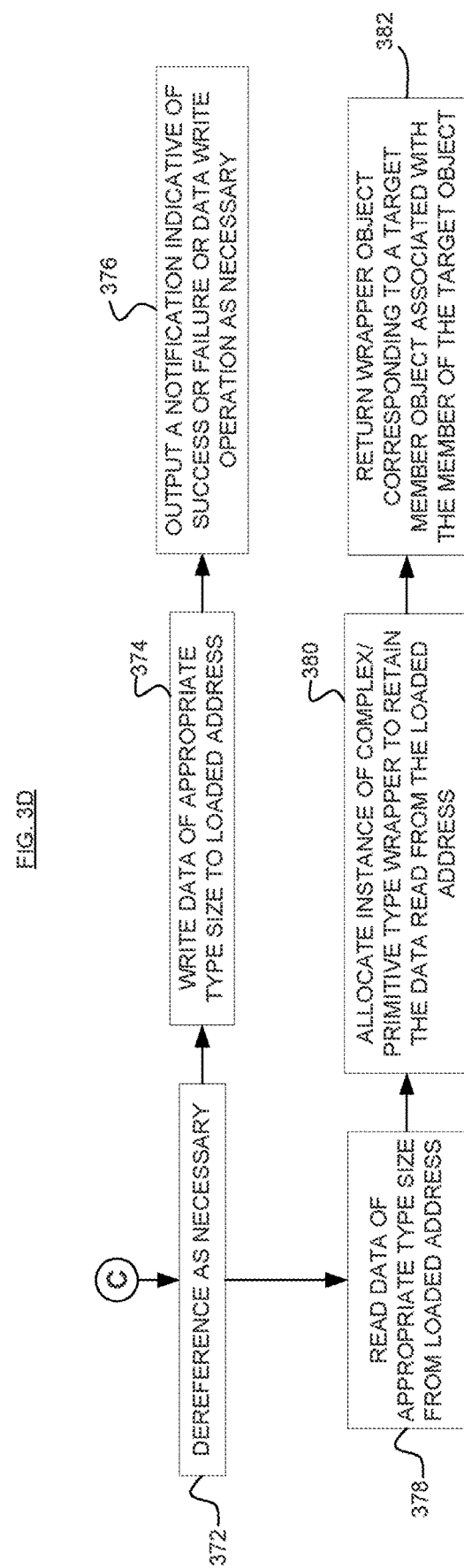

Referring to FIG. 3D, at step 372, the method can include dereferencing the loaded address as necessary. Dereferencing would be required if the target object is a pointer type, for example. Otherwise, no dereferencing is necessary. It is understood that not having to dereference is preferred and optimal, since it would require one less read of memory to determine the target address.

At step 374, the method can include writing data of the appropriate type size to the loaded address. Additionally, or alternatively, at step 378, the method can include reading data of the appropriate type size from the loaded address. Steps 374 and 378 can, for example, be effected depending on whether a set or fetch instruction is invoked at step 308 of method 300.

If data is to be read from the loaded address, then at step 380, the method can include allocating an instance of complex or primitive type wrapper to retain the data read from the loaded address.

At step 382, the method can include returning the wrapper object corresponding to a target member object associated with the member of the target object.

If data is written to the loaded address, then at step 376, the method can include outputting a notification indicative of a success or failure of step 374 as necessary. This can include, for example, invoking a function that returns success or failure status, or an exception returning failure or an equivalent. The return can be a calling code, e.g. implemented as part of the interposition proxy.

As noted above, the steps of method 200 can include or be effected via the steps of the exemplary process illustrated and described with respect to method 300. For example, step 202 can include one or more of steps 302-308; step 204 can correspond to step 310; step 206 can include one or more of steps 312-316 of method 300 and steps 352-360 of method 350; and step 208 can include one or more of steps 372-382.

Next, various ways for generating the interposition proxy are described. In some embodiments, the interposition proxy can be generated by one or more developers having the requisite knowledge. This can involve utilizing available language specifications (which may define memory layout), data structure information, header files that describe data types of an API, and the like, to create an abstraction layer in the form of a library of functions invocable to interact with remote memory. Alternatively, debug data can be extracted from a debug file, and used to generate the interposition proxy. Generally, debug files are products of compilers, and include metadata that assist debuggers in interpreting binary/compiled data. Here, debug data can include or be a condensed/abstracted representation of the information that is extracted from a debug file, for example, by using generic data structures not tied to the format of the debug file.

FIG. 4 shows a flowchart of a method 400 of extracting data from a debug file. Particularly, the extraction method includes opening a debug file at step 402 and parsing or otherwise processing a debug file (e.g. a DWARF file, a PDB file, or the like) by invoking an abstraction layer appropriate for the file type at step 404. The method also includes, at step 406, recording metadata regarding the debug file (e.g. compile date, compiler used, compiler options, architecture, notes, and the like) prior to further processing.

At step 408, the method includes determining whether there are new compilation units in the debug file to process. If the answer is yes, the method proceeds to step 410 at which the metadata (e.g. function signature, calling convention, and the like) associated with the compilation unit, or the binary result of a collection of assembled source code/files, and is recorded. For each compilation unit, the data types defined in the compilation unit are defined at step 412, and all global symbols and types are also processed at step 414 and the method returns to step 408.

If, at step 408, there are no new compilation units to process, method 400 proceeds to step 416 at which a determination is made as to whether there are new functions or subprograms in the debug file to process. Each function/subprogram is processed, by recording at least the function name, signature, size, location, and calling convention at step 418, recording locally defined types at step 420, and recording locally defined symbols and resolved types at step 414. At the end of the extraction process, the method ends and the collected data can be made available for consumption.

A data consumer (e.g. program source code of a) can request a full view of this data or select data therefrom (e.g. type or function name) for target data. A full view of the debug data can include a complete representation of the information provided in a debug file, such as, for example, all extracted symbols, types, functions, etc. Target data can be a particular symbol (e.g. "interesting_variable") in the debug file, a particular function in the debug file (e.g. function named "ABCD" that accepts only integers as parameters), all functions described in the debug file, or the like.

Figure 5:
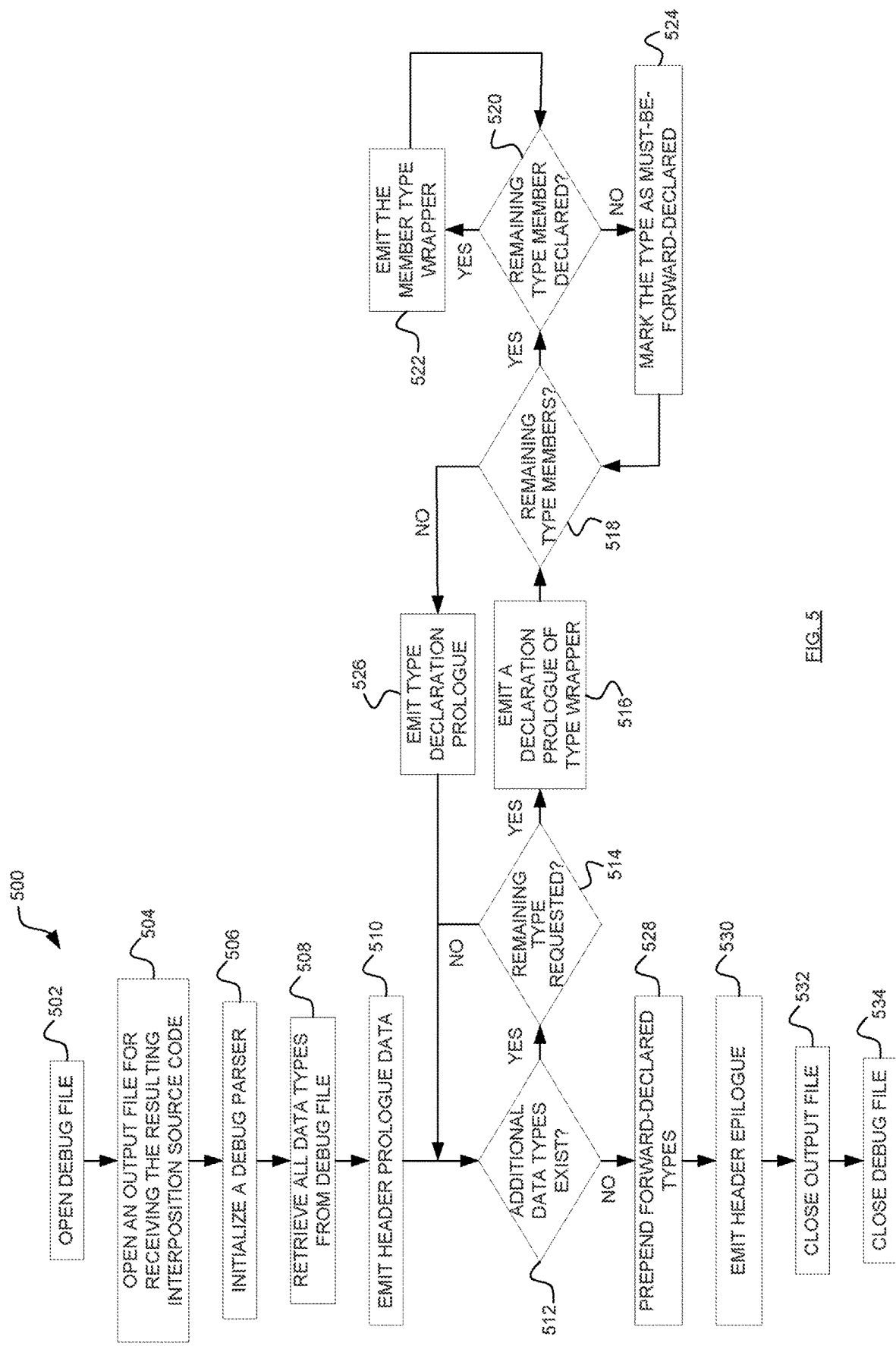
FIG. 5 shows a flowchart of an exemplary method 500 for generating an interposition proxy using data extracted from a debug file, in accordance with various embodiments.

FIG. 5 shows a flowchart of an exemplary method 500 for generating an interposition proxy using data extracted from a debug file, in accordance with various embodiments. To facilitate access to data stored in remote memory, a debug file can be parsed in order to generate type-specific code (i.e. code specific to the data stored in remote memory) using interposition proxy features. While unprocessed data types in the debug file exist, each is processed in turn. For each data type processed, its subcomponents are processed as well. Each data type encountered while processing can be emitted as a wrapped object using interposition proxy components. The proxy provides read/write access to memory, address translation, etc. The debug file may be obtained from multiple sources, such as via an identifier stored in OS memory or an identifier stored in the program binary file, or the debug file may be provided by a software manufacturer relevant to the application version being used, for example.

At step 502, the method can include opening a debug file. At step 504, the method can include opening an output file for receiving the resulting interposition proxy code. At step 506, the method can include initializing a debug parser. At step 508, the method can include retrieving all data types from the debug file. In some embodiments, some or all of steps 502-508 can correspond to one or more steps in method 400. Additionally, general purpose capabilities of the interposition proxy, such as functions and classes, for example, can be embedded in or referenced by the code generated from the debug file. These general purpose functions can facilitate creating/destroying interposition proxy handles, internal book-keeping, abstract types in support of debug types, and a means of accessing the remote memory itself. It should be understood that these general purpose functions may be embedded or referenced by the code before the header prologue data is emitted at step 510 or after the header epilogue is emitted at step 530.

At step 510, the method can include emitting header prologue data. In C++, for example, this can include "wrapper.h," "namespace," and the like. At step 512, the method can include determining whether there are additional data types. If, at step 512, it is determined that additional data types are requested, the method can proceed to step 514. On the other hand, if, at step 512, it is determined that no additional data types are requested, the method can proceed to step 528.

At step 514, the method can include determining whether a remaining type is requested. If, at step 514, it is determined that a remaining type is requested, the method can proceed to step 516. On the other hand, if, at step 514, it is determined that no remaining type is requested, the method can return to step 512.

At step 516, the method can include emitting a declaration prologue of type wrapper. This can be, for example, a statement defining a class name, its parent classes, etc. in generated code, without a closing bracket '}'.

At step 518, the method can include determining whether there are remaining type members. If, at step 518, it is determined that there are remaining type members, the method can proceed to step 520. On the other hand, if it is determined that there are no remaining type members, the method can proceed to step 526.

At step 520, the method can include determining whether a remaining member type has already been declared. If, at step 520, it is determined that a remaining member type has already been declared, the method can proceed to step 522. On the other hand, if, at step 522, it is determined that a remaining type member has not been declared, then the method can proceed to step 524. At step 522, the method can include emitting the member type wrapper.

At step 524, the method can include marking the type as "must-be-forward-declared" and returning to step 518. Marking the type as "must-be-forward-declared" can ensure that the generated source code compiles, and can more particularly keep track of yet-undeclared type wrappers so that they can be referenced before being defined in the generated source code.

At step 526, the method can include emitting type declaration prologue. At step 528, the method can include prepending forward-declared types. At step 530, the method can include emitting a header epilogue. At step 532, the method can include closing the output file. At step 534, the method can include closing the debug file.

The resulting code in the output file can include emitted data types, type sizes, location, members, member names, and the like, all with valid programming language syntax. In some embodiments, any types requiring forward declaration are emitted first, as required by the target language, so as to avoid dependency issues. The resulting code can embody an interposition proxy, and can include one or more libraries of functions invocable by program source code as an aid in describing addresses of remote memory spaces.

In various embodiments, the interposition proxy generated using method 500 is invocable and utilized as part of any of methods 200 and 300 described above. In some embodiments, the interposition proxy can also be invocable as a compilation, a just-in-time (JIT) compilation, or via interpretation. The logical flow shown in FIG. 5 can thus be utilized within a single-purpose program or dynamically at runtime within a larger program. For example, execution of observing task 112 can be performed by a compiler, a JIT compiler, or an interpreter.

Figure 6:
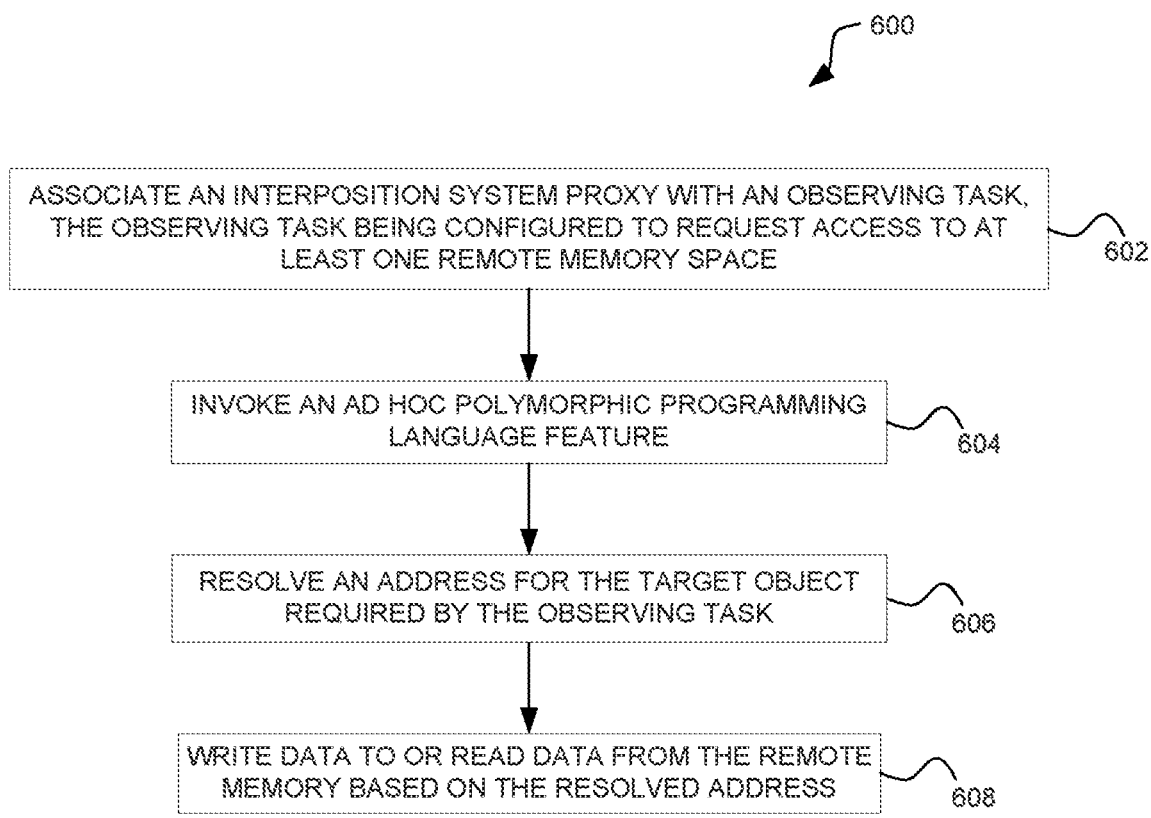
FIG. 6 shows a flowchart of an exemplary method 600 for invoking an interposition proxy and/or features therein to facilitate interactions with remote memory space(s), in accordance with various embodiments.

FIG. 6 shows a flowchart of an exemplary method 600 for invoking an interposition proxy and/or features therein to facilitate interactions with remote memory space(s), in accordance with various embodiments. At step 602, the method can include associating an interposition proxy with an observing task. The interposition proxy can include at least one function implemented using at least one ad hoc polymorphic programming language feature. The observing task can be configured to request access to at least one remote memory space. For example, interposition proxy 130 can be associated with observing task 112. Depending on the programming language selected for implementing the interposition proxy, the function and ad hoc polymorphic programming language feature(s) can vary. As described above, if the interposition proxy is implemented in C++, the function(s) can utilize operator overload features, such as member and/or array access operators, addition and/or subtraction operators, the dereferencing operator, or the like. If the interposition proxy is implemented in Python, the function(s) can involve function decorators.

At step 604, the method can include, during execution of the observing task, invoking the at least one ad hoc polymorphic programming language feature and resolving an address for at least one target object required by the observing task. In the scenario that the interposition proxy is implemented in C++, the address resolution can, for example, be effected according to one or more steps of methods 300, 350, and/or 370.

At step 606, the method can include at least one of writing data to and reading data from the at least one remote memory based on the resolved address.

It is understood that there are various ways to execute code. For example, code can be compiled into an executable and run in its executable form. As another example, code can be interpreted using an interpreter program and run as an interpreted script. As a further example, code can be dynamically generated and run via JIT compiling. Thus, the steps of method 600 can vary depending on the code execution environment.

In some embodiments, the observing task can be compiled into an executable along with the interposition proxy. In this scenario, step 602 can include combining high-level code (e.g. the core program source code of the observing task) with the source code of the interposition proxy. The combined code can be compiled using a compiler (e.g. a C++ compiler), and the resulting executable can be run. Address resolution and remote memory interaction (e.g. steps 604 and 606) can be subsequently performed during execution of the executable.

In other embodiments, the observing task can be dynamically interpreted, along with the source code of the interposition proxy, to arrive at an interpreted script. In this scenario, step 602 can similarly include combining high-level code (e.g. the core program source code of the observing task) with the source code of the interposition proxy. The combined code can be interpreted via interpreting software, and address resolution and remote memory interaction (e.g. steps 604 and 606) can be subsequently performed when the interpreted script is run.

In yet other embodiments, the observing task can be invoked in conjunction with invocation of a debug file abstraction layer with target types (see e.g. FIG. 4). In this scenario, step 602 can include dynamically generating code and/or objects based on high-level code (e.g. the core program source code of the observing task) and data types and description data extracted from the debug file (such as that extracted using method 400, for example,). The dynamically generated code can be compiled using a JIT compiler and invoked. Address resolution and remote memory interaction (e.g. steps 604 and 606) can be subsequently performed during invocation of the JIT-compiled result.

In certain embodiments, the novel interposition systems and methods disclosed herein also advantageously allow validation, verification, and/or assurance of data accessed from remote memory (e.g. data security). That is, the interposition systems disclosed herein can provide data validation similar to that which is available in C, for example, when traversing data structures stored in local memory. In the context of remote memory spaces, if "a" is an int with valid range 1-10, for example, the interposition system can identify whether the value stored in "a" is out of bounds with respect to the language specification (which defines memory layout). Certain functions, such as, for example, smart pointers in C++ output exceptions when addresses are invalid or allocates addresses for data if not yet allocated. The interposition system can leverage these functions or features to assist in validation of data when reading data from or writing data to remote memory.

It is to be understood that, although the interposition systems and methods and the observing task(s) that utilize such systems have been described herein in the context of specific languages (such as C, C++, Python), these systems and requestors can be implemented using other languages having the requisite features. For example, the program source code (e.g. of observing task 112) can be written in any suitable programming language (e.g. Java), and the interposition system can be implemented using any programming language that permits polymorphism or, in other words, the manipulation of its language operators, such as addition or subtraction operators, to perform other functions.

It should also be understood that the steps shown in each of methods 200, 300, 400, 500, and 600 are merely illustrative and that existing steps may be modified or omitted, additional steps may be added, and the order of certain steps may be altered.

The systems described herein, or portions thereof, can be implemented as a computer program product or service that includes instructions that are stored on one or more non-transitory machine-readable storage media, and that are executable on one or more processing devices to perform or control the operations described herein. The systems described herein, or portions thereof, can be implemented as an apparatus, method, or electronic system that can include one or more processing devices, parallel processing devices, and memory to store executable instructions to implement various operations.

It should be understood that the aspects, features and advantages made apparent from the foregoing are efficiently attained and, since certain changes may be made in the disclosed inventive embodiments without departing from the spirit and scope of the invention, it is intended that all matter contained herein shall be interpreted as illustrative and not in a limiting sense.

What is claimed is:

1. A system environment for facilitating interactions with a remote memory space, the system comprising:
   an observing task configured to submit requests for accessing the remote memory space; and
   an interposition proxy invocable during execution of the observing task to resolve an address for at least one target object in the remote memory space required by the observing task;
   wherein the interposition proxy is associated with the observing task, and the interposition proxy can be invocable as exception handlers triggered by imperative/procedural code coupled with deliberate access to a locally invalid memory address.

2. The system of claim 1 wherein the observing task comprises one of a process and a thread.

3. The system of claim 1 wherein the interposition proxy is instantiated in a first memory space, and wherein the first memory space is remote to the remote memory space.

4. The system of claim 1 wherein the interposition proxy includes at least one function implemented using at least one ad hoc polymorphic programming language feature.

5. The system of claim 4 wherein the at least one ad hoc polymorphic programming language feature comprises at least one overload operator.

6. The system of claim 5 wherein the at least one overloaded operator comprises at least one of a member or array access operator, an addition operator, a subtraction operator, and a dereferencing operator.

7. The system of claim 4 wherein the at least one ad hoc polymorphic programming language feature comprises at least one function decorator.

8. The system of claim 1 wherein the interposition proxy can be invocable as a compilation, a just-in-time (JIT) compilation, or via interpretation.

9. An interposition proxy, comprising:
   an ad hoc polymorphic programming language feature to facilitate requests from an observing task to an at least one remote memory space, wherein the ad hoc polymorphic programming language feature is capable of one or more of the following:
   implementing remote memory access functionality in a manner that is transparent;
   implementing at least one function to facilitate interactions with the at least one remote memory space;
   being invoked for a target object;

being utilized after invocation to traverse a data structure for the target object;
resolving an address in the remote memory space; and
being utilized after invocation to calculate an address of a parent or container data structure;
wherein the interposition proxy can further be invocable as exception handlers triggered by imperative/procedural code coupled with deliberate access to a locally invalid memory address.

10. The interposition proxy of claim 9 wherein the interposition proxy is a library loaded into a memory of the observing task.

11. The interposition proxy of claim 9 wherein the interposition proxy further includes a library of one or more invocable functions.

12. The interposition proxy of claim 11 wherein the one or more invocable functions are invocable during the execution of an observing task.

13. The interposition proxy of claim 11 wherein the one or more invocable functions include ad hoc polymorphic operator definitions, such as definitions for dereferencing, addressing calculations, and assignment operations.

14. The interposition proxy of claim 9 wherein the interposition proxy allows the use of a native language syntax to develop software that interacts with the at least one remote memory space.

* * * * *